(12) United States Patent
Sparenberg et al.

(10) Patent No.: US 8,494,680 B2
(45) Date of Patent: Jul. 23, 2013

(54) GUARD LOCK FOR A COMPONENT FOR CLOSING AN OPENING

(75) Inventors: Ingo Sparenberg, Ennepetal (DE); Andreas Wilting, Wetter (DE); Yasar Cevik, Hagen (DE); Yao Yu, Wuppertal (DE); Michael Herbote, Sprockhövel (DE)

(73) Assignee: K.A. Schmersal Holding GmbH & Co., Wuppert (DE)

( * ) Notice: Subject to any disclaimer, the term of this patent is extended or adjusted under 35 U.S.C. 154(b) by 421 days.

(21) Appl. No.: 12/881,469

(22) Filed: Sep. 14, 2010

(65) Prior Publication Data
US 2011/0066288 A1    Mar. 17, 2011

(30) Foreign Application Priority Data
Sep. 14, 2009   (DE) .......................... 10 2009 041 101

(51) Int. Cl.
*G06F 7/04* (2006.01)
*B05C 1/06* (2006.01)

(52) U.S. Cl.
USPC .......................................... 700/275; 292/144

(58) Field of Classification Search
USPC ................... 700/275, 177; 292/144; 70/257, 70/277, 278.1, 278.7, 333 R
See application file for complete search history.

(56) References Cited

U.S. PATENT DOCUMENTS

| | | | | |
|---|---|---|---|---|
| 3,806,171 A | * | 4/1974 | Fernandez | 292/39 |
| 5,480,198 A | * | 1/1996 | Wydler et al. | 292/144 |
| 5,511,832 A | * | 4/1996 | Kunzel | 292/144 |
| 6,022,056 A | * | 2/2000 | Cope et al. | 292/144 |
| 7,086,258 B2 | * | 8/2006 | Fisher et al. | 70/278.7 |
| 8,234,817 B2 | * | 8/2012 | Neundorf et al. | 49/280 |
| 2010/0231350 A1 | * | 9/2010 | Scharer et al. | 340/5.2 |
| 2011/0259060 A1 | * | 10/2011 | Leska et al. | 70/174 |

FOREIGN PATENT DOCUMENTS

| | | |
|---|---|---|
| JP | 07237707 A | 9/1995 |
| JP | 2003097108 A | 4/2003 |
| JP | 2008267056 A | 11/2008 |

OTHER PUBLICATIONS

English translation of Office Action dated Sep. 14, 2012 issued from Japanese Patent Office for JP 2010-205-799.
English translation of Office Action dated Nov. 28, 2012 issued from the Chinese Patent Office for CN2801998Y.

* cited by examiner

*Primary Examiner* — Dave Robertson
(74) *Attorney, Agent, or Firm* — Kilpatrick Townsend & Stockton LLP

(57) ABSTRACT

Guard lock for a component for closing an opening having a fixed part and a movable part, with a bolt, which is guided movably between a locking and an unlocked end position in the longitudinal direction of the bolt, a drive implementing a movement for moving the bolt and a transmission device between the drive and the bolt, wherein the drive is an electric motor, and the drive, the transmission device and the bolt are coupled in terms of movement in such a way as to directly transfer kinetic energy, it being possible for the bolt speed to be regulated via a control, and it being possible for monitoring of the movement of the drive, which is coupled in terms of movement to the bolt, to be implemented by the control, and the control being connected to at least one sensor for determining the position of the movable part relative to the fixed part.

11 Claims, 2 Drawing Sheets

GUARD LOCK FOR A COMPONENT FOR CLOSING AN OPENING

The invention relates to a guard lock for a component for closing an opening in accordance with the preamble of claim 1.

BACKGROUND OF THE INVENTION

Guard locks are known as part of an access protection device for a closable area of a machine installation which may be the source of a potential hazard. The installation may be, for example, machines or components such as robots for manufacturing, treating or processing workpieces and chemical installations or the like.

A guard lock is arranged between a door or shutter closing the area as movable part and opposing walls or a frame as fixed part. The at least one door or flap, which may be sealed around the periphery and which can be opened and closed by pivoting or sliding, can be arrested or locked by the guard lock.

In each case at least one safety sensor is located between the door and the adjacent wall. In addition, a control is provided which is coupled to the machine installation and the safety sensor in order to enable or disable the guard lock corresponding to the operating state of the machine installation for opening the door. If the machine installation no longer represents a source of a potential hazard for people, i.e. it is possible to reach into the area through the door or to enter the area via the door, by virtue of a standstill state of the movable parts of the machine installation being signalled to the control, for example, by standstill monitors, for example, the control enables the guard locks, with the result that a person can access the area by opening the doors.

If at least parts of the machine installation are not at a standstill or precautions which otherwise need to be taken have not yet been implemented prior to opening of the doors, the guard locks are blocked, with the result that the doors cannot be opened. In addition, the control prevents the machine installation from being brought into operation when at least one door is open.

DE 10 2004 030 362 A1 discloses an apparatus for the controlled locking of a safety-relevant device, such as a safety door or the like, for example. The apparatus has a locking element, which is mounted movably, can be driven by a drive element and can be brought out of a housing of the apparatus into form-locking engagement with the device to be locked for locking purposes.

One disadvantage with the apparatus known from DE 10 2004 030 362 A1 is that, in the event of the locking element being blocked, the drive and/or the locking element can be subject to damage since the locking element and/or the drive can be bent or overheated. The guard lock is then defective and needs to be replaced, which results in downtimes and repair and maintenance work.

The object of the invention is therefore to provide a guard lock for a component for closing an opening in accordance with the preamble of claim 1, with which guard lock a simple configuration of an improved and safe guard lock is possible, in which damage to the guard lock can be prevented with simple means.

BRIEF SUMMARY OF THE INVENTION

This object is achieved by the features of claim 1.

As a result, a guard lock for a component for closing an opening in accordance with the preamble of claim 1 is provided. The opening has a movable part such as a door, shutter or cover, for example, and an immovable part, such as a wall or a frame, for example. A bolt is guided movably between a locking and an unlocked end position in the longitudinal direction of the bolt. A drive implementing a movement for moving the bolt and a transmission device are provided between the drive and the bolt. The drive is in the form of an electric motor, wherein the drive, the transmission device and the bolt are coupled in terms of movement with direct transfer of kinetic energy. By virtue of the fact that the drive is coupled to the bolt mechanically in terms of movement, monitoring of the movement of the drive is equivalent to and synonymous with monitoring of the movement of the bolt. If the drive moves, the bolt also moves, and vice versa. A control is provided which can regulate the speed of the bolt movement. In addition, the control is designed to monitor a movement of the drive. The control is connected to at least one sensor, with the result that the control can determine the relative position of the movable part with respect to the fixed part. The movement of the drive acts directly on a movement of the bolt without any energy storage means interposed. The drive, the transmission device and the bolt are coupled with direct transfer of kinetic energy. The transmission device is purely in the form of a gear unit, which converts the rotary movement at the output shaft of the electric motor into a translatory movement of the bolt.

By using an electric motor as the drive, a prejudice which exists in the technical field is overcome in that, until now, the opinion has been that an electromagnet arrangement necessarily needs to be provided in a guard lock. Although alternative drives for the electromagnet arrangement have already long been known in other fields, they have not been used in safety-related guard locks owing to the prejudice held by those in the technical field since an electromagnet arrangement responds quickly, has a robust design and is relatively inexpensive in terms of manufacture. Using a component other than an electromagnet for actuating the bolt has been repeatedly ruled out owing to these considerations since there has also been the concern that there would be an interferenced in terms of the electromagnetic fields occurring in the case of an electric motor, which would absolutely rule out the use thereof for a safety-related component.

The inventors have found that, owing to the quick response of an electromagnet arrangement, the speed is not so decisive, even though it is a safety-related guard lock which is involved. A high degree of safety is achieved even with a relatively low bolt speed in comparison with the "instantaneous" actuation via an electromagnet since the inventors have for the first time established that, even with the speeds which can be achieved by an electric motor, a reasonable reaction time of a machine operator, for example in the course of an intended opening operation of the movable part or of the door, can be met. It is possible for the bolt to implement a travel of 20 mm, for example, in one or two seconds. The corresponding speed of the bolt of 20 mm/s, for example, is sufficient both for safety requirements and for the other requirements of the machine manufacturer and operator as regards handling. With the mentioned speed, it is therefore possible to achieve an actuation of a bolt which protrudes approximately 20 mm out of the housing of the guard lock within a time window of approximately one second.

Prevention of jamming of the bolt and/or prevention of destruction of the drive can be achieved via the control by virtue of said control regulating the speed of the bolt and at the same time monitoring the movement of the drive in order to establish whether the bolt "jams" or "bottoms out". By virtue of the coupling in terms of movement, the monitoring of the movement of the drive can be synonymous with monitoring of the movement of the bolt. This monitoring of the movement of the drive by the control can be achieved by determining the time which is required by the bolt to travel between the two end positions and a comparison with a predetermined threshold value for this time. When the threshold value which can be stored in a memory of the control is overshot, the drive can be shut down and a fault signal output by the control. The reaching of the end positions can be implemented via at least one sensor, which is connected to the control. The sensor can be in the form of a light barrier, an RFID sensor, a pulse-echo sensor, a mechanical contact, a reed contact or a Hall sensor. Provision can also be made for the rotation of the drive to be implemented via "rotation monitoring" of the drive. The time measurement and the "rotation monitoring" can also be provided together in one embodiment. For example, "rotation monitoring" can be achieved by virtue of the fact that the electric motor is in the form of a stepper motor, which gives feedback to the control via the rotation. In addition, the control determines the position of the movable part relative to the fixed part in order to provide protection against jamming and/or overheating of the drive by virtue of the control being connected to at least one sensor for position determination. This means that the bolt can be withdrawn only after signalling to the effect that the movable part is located in the position in which it is to be locked.

Various advantages are associated with the electric motor drive of the bolt. The drive per se is very difficult to manipulate since it is not influenced in any way by a magnetic field. In addition, a greater excursion (substantially more than 10 mm, i.e. a plurality of factors of this order of magnitude) can be achieved than in the case of the use with an electromagnet, wherein, in addition, it is possible to realize a force effect on the bolt which is virtually constant over the excursion.

By virtue of the use of an electric motor drive which is in the form of a "rotary motor" with a mechanical transmission device, the movement of the bolt is reversible and no use is made of a spring biased arrangement in order to possibly achieve a reverse excursion of the bolt. In addition, defined bolt positions, which are arranged between the maximum bolt excursion positions, can be approached, with it being possible for the speed of the bolt to be influenced by the selection of the gear ratio or by the adaptable transmission device and to be adjusted, in a manner which can be regulated, by means of the electronic control of the electric motor. The transmission device in this case converts the rotary movement of the electric motor into a linear movement of the bolt. Under a lateral load of approximately 100 N (for example by bracing the doors or the movable part), the bolt can apply an unlocking/locking force of approximately half the side load.

In addition, in the event of a power failure, the guard lock with the electric motor drive and the mechanical transmission device maintains that state of the guard lock which was last present prior to the power failure. The guard lock is in the form of a bistable system.

Preferably, the maximum permissible current consumption of the electric motor is limited to 800 mA, in particular 600 mA, particularly preferably 500 mA. As a result, a high movement power of the bolt is achieved with a low current consumption by the electric motor. In addition, it may be preferred if the electric motor has, at the output shaft, a power of from 0.2 Nm to 0.4 Nm and a speed of between 70 rpm to 170 rpm results. A current consumption which is relatively high for a short period of time can be switched by a suitable capacitor.

Preferably, a further sensor is provided, which is in the stand still or stationary state in relation to the bolt movement and is connected to the control and with which it is possible to determine the reaching of the end positions of the bolt. The control can therefore establish whether and when the end position of the bolt has been reached irrespective of whether the drive has been actuated. The further sensor provides the possibility of safely ascertaining whether the end positions have been reached.

A compact configuration of the guard lock is made possible by a preferred arrangement of the electric motor transversely with respect to the movement of the bolt. For a further reduction in the volume of the guard lock, the electric motor can preferably be arranged longitudinally with respect to the movement of the bolt. For this purpose, the bolt can have a toothed rack, which is preferably integrally formed thereon, as part of the transmission device, said toothed rack being in engagement with a worm gear, which is connected to the drive, as a further part of the transmission device.

The transmission device purely as a gear unit preferably has a spur gear, which is connected to the drive, and a toothed rack, which is in engagement with the spur gear and is connected to the bolt. As a result, an inexpensive guard lock which is simple to plan in terms of design and manufacture and to fit is provided.

The transmission device purely as a gear unit can preferably have a worm gear, which is connected to the drive, and a toggle lever assembly, which is in engagement with the worm gear and is connected to the bolt. As a result, an inexpensive guard lock which is simple to plan in terms of design and manufacture and to fit is provided. In addition, a high transmission/"lever action" is possible by virtue of the toggle lever assembly.

Preferably, the sensor with which the movement or position of the bolt can be determined is in the form of a light barrier, an RFID sensor, a pulse-echo sensor, a mechanical contact or a Hall sensor, in order to realize an inexpensive and at the same time reliable guard lock, wherein the sensor can be selected depending on the external conditions, which also include manipulation safety.

BRIEF DESCRIPTION OF THE DRAWINGS

The invention will be explained in more detail below with reference to the exemplary embodiment illustrated in the attached drawings.

DETAILED DESCRIPTION OF THE INVENTION

Figure 1:
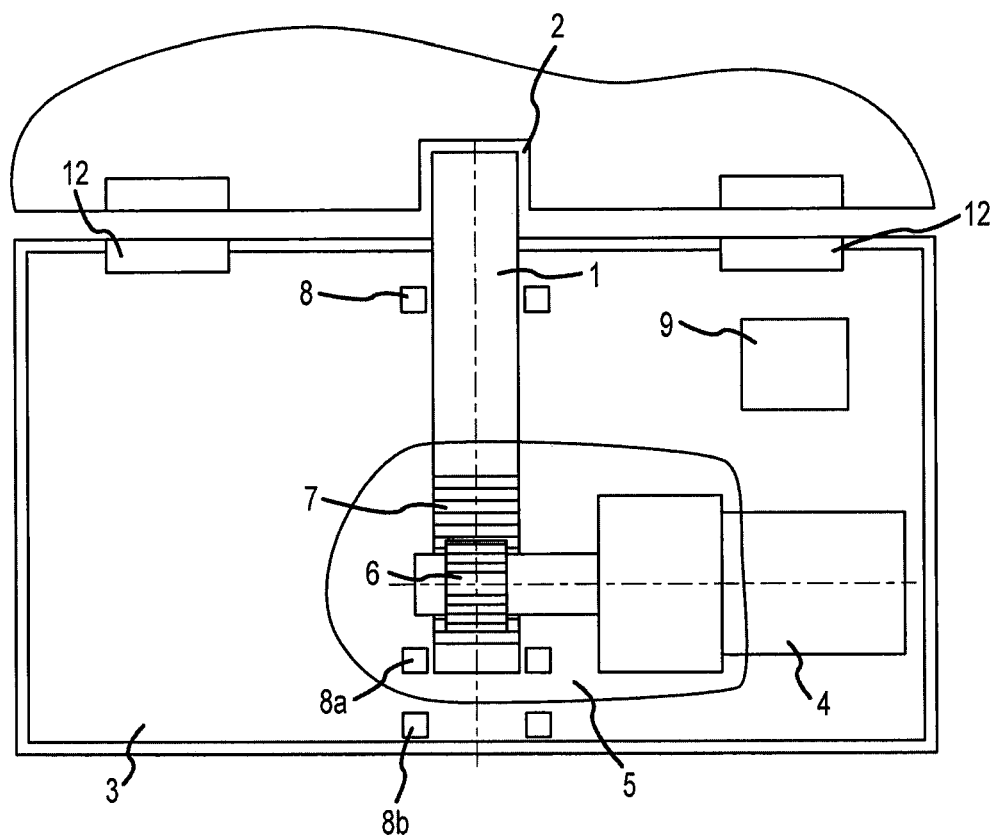
FIG. 1 shows a schematic of a guard lock according to the invention in an locking position or with the bolt withdrawn.

FIG. 1 shows a schematic of a guard lock according to the invention in an locking state. The door illustrated in the drawing, as movable part, can be held shut with respect to a fixed wall (not illustrated) as fixed part by a bolt 1 if the guard lock is fastened to one of the two parts and engages in a form-locking manner with the bolt 1 in a corresponding cutout 2 in the other part. The bolt 1 is located in an locking or blocking end position.

In the unlocked end position, the bolt 1 has been inserted substantially into the housing 3.

In the locking end position in FIG. 1, the bolt 1 has been withdrawn from the housing 3 and can lock the door. For this purpose the bolt 1 engages in the cutout 2 in the door or the wall in a form-locking manner depending on which of the two parts, i.e. the door or the wall, has been fitted with the guard lock.

The bolt 1 is guided movably in the bolt longitudinal direction. For driving the bolt 1, a drive 4 is provided, which can move the bolt 1 via a transmission device 5 coupled therebetween. In principle, the drive 4 drives the transmission device 5, which in turn moves the bolt 1. The drive 4 is in the form of an electric motor. The transmission device 5 is purely in the form of a gear device.

The bolt 1 slides at one end in a guide surrounding the bolt circumference for a linear movement.

The transmission device 5 has a spur gear 6, which is connected to the drive 4, and a toothed rack 7, which is in engagement with the spur gear 6 and is connected to the bolt 1. The spur gear 6 is connected directly to the drive 4. The spur gear 6 is directly in engagement, in a form-locking manner, with the toothed rack 7, which is connected directly to the bolt 1 with direct transfer of the movement of the toothed rack 7 to the bolt 1.

The transmission device 5 converts the rotary movement of the drive 4 into a translatory movement of the bolt 1.

The drive 4 is connected to the bolt 1 directly via the transmission device 5, which is in the form of a gear unit. For this purpose, the drive 4, the transmission device 5 and the bolt 1 are connected to one another in such a way that a movement of the transmission device 5 or of the drive 4 results in a direct movement of the bolt 1. In addition, the drive 4, the transmission device 5 and the bolt 1 are connected to one another in such a way that a movement reversal of the drive 4 results in an immediate movement reversal in the transmission device 5. Bolt 1, drive 4 and transmission device 5 are coupled to one another mechanically directly by means of a form-locking engagement. The direct mechanical coupling results in direct reversal of the bolt movement direction in the event of a reversal of the movement of the drive 4. The connection of the drive 4, transmission device 5 and bolt 1 is characterized by a direct transfer of kinetic energy.

In order to monitor the movement of the bolt 1, a sensor 8 is provided which determines the end position in which the bolt 1 is located. In the exemplary embodiment illustrated, the sensor 8 is in the form of a light barrier. In the case in which the bolt 1 has travelled back in the housing, the bolt 1 does not impede the light barrier, and the sensor 8 can produce a signal to the effect that the bolt 1 is located in the unlocked position. In this case, provision can be made for the sensor 8 to emit the signal "light barrier blocked" in the end positions by virtue of the fact that it is possible, by means of the light barrier, for a cutout in the bolt 1 to be detected, and the cutout being arranged with respect to the light barrier in such a way that the light barrier is not blocked by the cutout between the end positions. In the end positions, the edge of the cutout is detected by the sensor 8 or the light barrier and the light barrier is interrupted.

Provision can also be made for the sensor 8 to be arranged, as a stationary light barrier, in relation to two through-holes traversing the bolt 1 in such a way that, in the end positions, the light barrier passes unimpeded through the two through-holes and is interrupted by the bolt 1 during the movement of the bolt 1.

Provision can also be made for two sensors 8a, 8b, which are in the form of light barriers and are spaced apart in the longitudinal direction or travel direction of the bolt 1 approximately by the movement excursion of the bolt 1, to be provided at that end of the bolt 1 which is remote from the housing exit or on the extension with the transmission device 5. The sensor 8a illustrated in FIG. 1 can then produce the signal "light barrier free", for example when the bolt 1 is withdrawn, in the same way as the sensor 8b. When the bolt 1 is inserted, the two sensors 8a, 8b produce the signal "light barrier interrupted".

In an alternative exemplary embodiment, the sensors 8a and 8b, which are in the form of spaced-apart light barriers, can also be arranged in the front region in the housing 3 adjacent to the through-opening for the bolt 1. An arrangement in the region of the through-opening provides a more compact design.

The sensors 8, 8a and 8b can also be in the form of an RFID sensor, a pulse-echo sensor, a mechanical contact, a reed contact or a Hall sensor for determining the position of the bolt 1. The position in the housing 3 can largely correspond to the positions of the sensors 8, 8a and 8b, which are in the form of a light barrier.

In order to drive the drive 4 or the electric motor, a control 9 is provided which is also connected to the sensor 8 in order to determine, for example, the end position in which the bolt 1 is located. The control 9 can also be designed to determine the time which is required by the bolt for the movement from one end position to the other end position. It is thus possible to determine whether the drive 4 can move "freely" and the bolt 1 is not "bottoming out" or impeded. Using the speed of the bolt 1 regulated by the control 9 and the travel path between the end positions, the maximum permissible time can be stored as a threshold value in a memory of the control 9 or calculated from this. If the threshold value is overshot, it can be assumed that the movement of the bolt 1 and the drive 4 is impeded.

Since there is a direct mechanical coupling of drive 4, transmission device 5 and bolt 1, the bolt 1 would necessarily move in the event of a current being applied to the electric motor. If, however, there is a blockage outside the housing 3, the bolt 1 cannot move. This blockage can be caused by jamming of the bolt 1 by the cutout 2 not being in the position shown in FIG. 1, but the bolt 1 being wedged in the cutout 2 (from the locking position into the unlocked position) or not being able to move into the cutout 2 or out of the housing 3 (from the unlocked position into the locking position). In the event of the blockage, the control can determine the blockage via the sensor 8 and generate a fault signal. In order to monitor a movement of the drive 4, provision can also be made for the drive 4, which is in the form of an electric motor, to be a stepper motor, which provides feedback to the control 9 via the "performed" movement. For example, in the event of the blockage of the movement of the drive 4, the drive 4 can be shut down and a fault signal can be output by the control 9.

At least one further sensor 12 is fitted on the housing 3 of the guard lock on the side facing the movable part in order to establish whether the movable part is in the position to be locked or not. The sensor 12 is connected to the control 9, and the control 9 identifies the position of the movable part, wherein the bolt 1 is withdrawn into the locking end position only when the sensor 12 has "positively" identified the position of the movable part. Preferably, the sensor 12 is in the form of an RFID sensor or a pulse-echo sensor (CSS).

Figure 2:
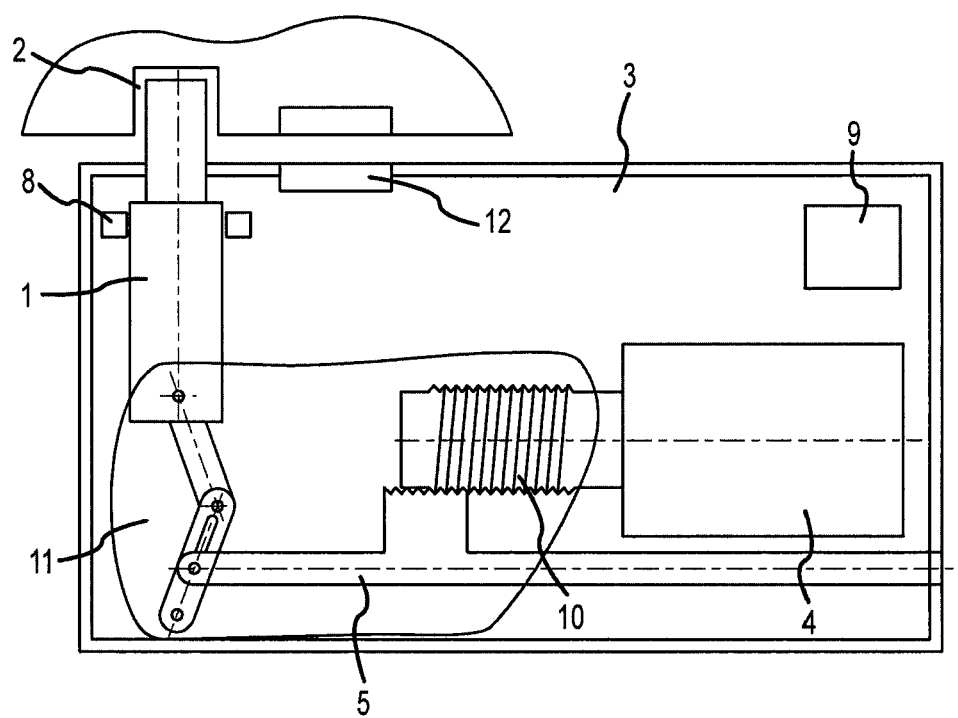
FIG. 2 shows a schematic of a further exemplary embodiment of a guard lock according to the invention in an locking position or with the bolt withdrawn.

In the exemplary embodiment of a guard lock according to the invention shown in FIG. 2, the transmission device 5 has a worm gear 10, which is connected to the drive 4, and a toggle lever assembly 11, which is in engagement with the worm gear 10 and is connected to the bolt 1. The configuration of the other elements in the guard lock otherwise corresponds to the exemplary embodiment shown in FIG. 1.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

The invention claimed is:

1. A guard lock for a component for closing an opening comprising:
    a fixed part;
    a movable part;
    a bolt, which is guided movably between a locking and an unlocked end position in the longitudinal direction of the bolt;
    a drive configured to rotate to move the bolt via a transmission device, which is positioned between the drive and the bolt, wherein the drive is an electric motor, and the drive, the transmission device and the bolt are coupled in terms of movement in such a way as to directly transfer kinetic energy;
    a control operable to regulate the speed of the bolt and to monitor the movement of the drive, wherein the control is connected to at least one sensor for determining the position of the movable part relative to the fixed part, wherein the control is also connected to a second sensor that is configured to determine the position of the bolt, and wherein the control is connected to the drive to obtain feedback related to the performed rotational motion of the drive.

2. The guard lock according to claim 1, wherein the maximum permissible current consumption of the electric motor is limited to 800 mA.

3. The guard lock according to claim 1, wherein a further sensor is provided, which is connected to the control and with which it is possible to determine that the end positions of the bolt have been reached.

4. The guard lock according to claim 1, wherein the drive is arranged transversely with respect to the movement direction of the bolt.

5. The guard lock according to claim 1, wherein the transmission device has a spur gear, which is connected to the drive, and a toothed rack, which is in engagement with the spur gear and is connected to the bolt.

6. The guard lock according to claim 1, wherein the transmission device has a worm gear, which is connected to the drive, and a toggle lever assembly, which is in engagement with the worm gear and is connected to the bolt.

7. The guard lock according to claim 1, wherein the sensor is in the form of an RFID sensor, a pulse-echo sensor, a mechanical contact, a reed contact or a Hall sensor.

8. The guard lock according to claim 3, wherein the further sensor is in the form of a light barrier, an RFID sensor, a pulse-echo sensor, a mechanical contact, a reed contact or a Hall sensor.

9. The guard lock according to claim 1, wherein the control has a memory for a time threshold value, and wherein the control is operable to compare the time threshold value with the time which is required by the bolt for a movement between the end positions.

10. The guard lock according to claim 1, wherein the maximum permissible current consumption of the electric motor is limited to 600 mA.

11. The guard lock according to claim 1, wherein the maximum permissible current consumption of the electric motor is limited to 500 mA.

* * * * *